(12) United States Patent
Goetz et al.

(10) Patent No.: US 10,556,361 B2
(45) Date of Patent: Feb. 11, 2020

(54) FEED SYSTEM FOR COATING MATERIAL

(71) Applicant: HOMAG GmbH, Schopfloch (DE)

(72) Inventors: Reiner Goetz, Horb-Diessen (DE); Johannes Schmid, Starzach (DE)

(73) Assignee: Homag GmbH, Schopfloch (DE)

( * ) Notice: Subject to any disclaimer, the term of this patent is extended or adjusted under 35 U.S.C. 154(b) by 0 days.

(21) Appl. No.: 15/742,487

(22) PCT Filed: Jul. 15, 2016

(86) PCT No.: PCT/EP2016/066907
§ 371 (c)(1),
(2) Date: Jan. 5, 2018

(87) PCT Pub. No.: WO2017/009455
PCT Pub. Date: Jan. 19, 2017

(65) Prior Publication Data
US 2018/0200915 A1    Jul. 19, 2018

(30) Foreign Application Priority Data
Jul. 16, 2015   (DE) .................... 10 2015 213 358

(51) Int. Cl.
*B27D 5/00*    (2006.01)
*B65H 19/12*    (2006.01)
(Continued)

(52) U.S. Cl.
CPC .......... *B27D 5/003* (2013.01); *B65H 16/021* (2013.01); *B65H 19/12* (2013.01); *B29C 63/02* (2013.01);
(Continued)

(58) Field of Classification Search
None
See application file for complete search history.

(56) References Cited

U.S. PATENT DOCUMENTS 2,860,841 A * 11/1958 Jacobsen ............ B65H 23/0326
242/563.1
3,685,760 A * 8/1972 Fedor .................. B65H 16/021
242/560.2
(Continued)

FOREIGN PATENT DOCUMENTS

DE    7124982 U    10/1972
DE    3415747 A1    9/1985
(Continued)

OTHER PUBLICATIONS

Written Opinion of the International Searching Authority from PCT/EP2016/066907, dated Oct. 18, 2016, 5 pages.

*Primary Examiner* — Binu Thomas
(74) *Attorney, Agent, or Firm* — Morgan, Lewis & Bockius LLP

(57) ABSTRACT

A system for feeding a coating material from at least one movable modular unit to a coating device is provided, the at least one movable modular unit being provided for the storage and provision of roll-type or coil-type coating material units including edge strips for applying to a narrow side of panel-type workpieces. A feed section holds and transports the coating material. A cassette unit guides the coating material provided by the feed section. A coupling section couples the at least one movable modular unit to the feed section, the at least one movable modular unit holding coating material units.

15 Claims, 7 Drawing Sheets

(51) Int. Cl.
*B65H 16/02* (2006.01)
*B29C 63/02* (2006.01)

(52) U.S. Cl.
CPC ............ *B65H 2301/4175* (2013.01); *B65H 2301/41398* (2013.01); *B65H 2405/422* (2013.01); *B65H 2701/1938* (2013.01)

(56) References Cited

U.S. PATENT DOCUMENTS

| | | | | |
|---|---|---|---|---|
| 3,795,166 A | * | 3/1974 | Brand ................ | B65H 16/021 83/220 |
| 4,632,326 A | * | 12/1986 | Boote ................ | B65H 16/021 242/410 |
| 6,056,232 A | * | 5/2000 | Karaki ................ | G03B 17/26 242/559.3 |
| 2004/0041056 A1 | * | 3/2004 | Beccari ................ | B65H 16/10 242/559 |
| 2010/0269971 A1 | * | 10/2010 | Schmid ................ | B29C 63/003 156/60 |

FOREIGN PATENT DOCUMENTS

| | | |
|---|---|---|
| DE | 102011006319 A1 | 10/2012 |
| DE | 102012202503 A1 | 8/2013 |
| EP | 0589089 A1 | 3/1994 |
| EP | 0728561 A1 | 8/1996 |
| EP | 1860593 A2 | 11/2007 |
| EP | 1862949 A2 | 12/2007 |
| EP | 1977869 A1 | 10/2008 |
| EP | 2253440 A2 | 11/2010 |
| EP | 2505322 A1 | 10/2012 |
| EP | 2762283 A1 | 8/2014 |

* cited by examiner

FEED SYSTEM FOR COATING MATERIAL

CROSS-REFERENCES TO RELATED APPLICATIONS

This application is a national stage of International Patent Application No. PCT/EP2016/066907, filed Jul. 15, 2016, which claims the benefit of priority under 35 U.S.C. § 119 of German Patent Application No. 102015213358.3, filed on Jul. 16, 2015, all of which are hereby incorporated by reference in their entirety for all purposes.

TECHNICAL FIELD

The present invention relates to a system for feeding a coating material to a coating device, said coating device being in particular provided for coating a narrow side of a panel-like workpiece. Such panel-like workpieces can, for example, be furniture panels, kitchen panels, etc., or relate to elements in the field of the construction element industry.

PRIOR ART

EP 2 253 440 A2, which relates to a feed device for feeding a coating material to a machine for coating workpieces, is the known prior art. The feed device includes at least one guiding device for guiding a coating material, at least one conveying device for conveying the coating material and at least one retaining device for retaining the coating material in at least one direction. In addition, at least one conveying element of the conveying device is provided in an inlet region of the guiding device.

An identification device for the resource management of piece goods according to EP 1 862 949 A2 is also known. The cited document relates in particular to a cassette for accommodating edge material available in roll form for use on throughput, stationary or similar machines, including a housing for holding the edge material available in roll form.

However, just recently, ever-increasing demands have been made of resource management, as a result of which non-productive times need to be kept to an absolute minimum and the material required for a tangible processing step is supposed to be provided at the right time in the right amount.

SUBJECT MATTER OF THE INVENTION

An aim of the present invention is to provide a system for feeding a coating material, in particular an edge band, which enables the non-productive times to be shortened and the coating material to be easily handled at the same time.

The subject matter of claim 1 provides such a system. Preferred embodiments are listed in the dependent claims and are clarified in the following description.

One idea of the present invention is to structure the provision of the coating material in a novel way, by modularly combining units for coating material, which are provided in cassettes for example.

A further idea of the invention, which can also be considered independently of the aforementioned aspect, is to structure the feed for the coating material to such an extent in a novel way that the operator simply inserts the coating material in an actuator located relatively close to the coupling section, which transports the coating material onwards.

The use of the modular unit or modular units, which in turn accommodate the coating material units, allows coating materials to be coupled in groups in the area of the coupling section. This enables the modular unit to be charged in advance by an operator of an edge attaching device, with said operator then loading a modular unit with several, preferably different, coating materials, as required. Where appropriate coating materials remain available during the load, due to a further modular unit in the area of the coupling region, thus ensuring that the operation of the edge attaching device need not be interrupted.

It is also possible to fabricate coating materials demand-driven in advance, in order to integrate the various coating materials in a production workflow in a demand-driven manner.

A cassette for accommodating a coating material includes, for example, a box-like housing. A winding of the coating material (coating material unit) is accommodated inside the box-like housing on a winding core secured in the center of the box-like housing.

For further clarification of a cassette, which can, for example, be loaded in a modular unit according to the present invention, please refer to EP 1 862 949 A2, which is incorporated herein by reference. A cassette of this nature may be provided with or without an identification device, such as an RFID chip.

According to a preferred embodiment, each modular unit is configured to accommodate cassettes, wherein each cassette accommodates a coating material unit. The coating material units are thus protected against external influences and are easily loadable in a modular unit. Alternatively or simultaneously, it is possible to accommodate the coating material units in a modular unit without cassette.

Moreover, at least one of the modular units may have a grid to accommodate cassettes of a certain width. A specific modular unit can thus be characteristic for a specific type of coating material unit.

The term "grid" in this context means, for example, a plurality of insertion rails or insertion guides.

An insertion rail of the modular unit can thus penetrate a corresponding recess of a cassette for accommodating a coating material unit and align and guide the cassette during insertion in the housing of the accommodation device.

An insertion guide may, for example, be formed by a recess or two strips running parallel to each other, penetrated by a protrusion of a cassette with a coating material unit.

As an alternative to the aforementioned grid, at least one of the modular units may have a variable insert, in order to accommodate cassettes of different widths. Cassettes support themselves thereby with coating material units or mutually vis-à-vis inner sides of the modular unit housing. This enables a further increase in flexibility when using a specific modular unit.

According to another embodiment, the modular unit may also be provided to accommodate coating material units without cassettes.

In one embodiment, the feed section in the area of the coupling section has a deflection roller for guiding a coating material of a coating material unit from an operating side of the feed section/coupling section to a machine side of the accommodation device. This structure facilitates the handling of the coating material.

A deflection roller of this nature is particularly preferred when the coating material is moved at high speed. This enables the dynamics to be cushioned by the deflection roller.

In particular, in case of low speeds of movement of the coating material, the deflection roller may also be omitted according to an alternative modification of the present invention.

According to one embodiment, the coupling section has an electrical interface for electrically coupling the modular unit with the feed section. The coupling may be used for energy and/or data transmission, thus, for example, allowing an existing display on the modular unit to be supplied with energy. Moreover, an existing storage unit on the modular unit can be read out, so that the feed section receives information with respect to the coating materials located in the modular unit. A control device located on the modular unit may also be operated. According to a further variant, it is possible to operate a motor provided in the modular unit, in order to move a coating material, or to release a motorized lock of the modular unit at the coupling section.

According to a further embodiment, the coupling section includes a connection section for hydraulically, pneumatically or mechanically coupling the modular unit with the feed section. This, for example, allows energy to be transmitted from the coupling section to the modular unit. The transmitted energy may, for example, be used in the modular unit to cause a movement of the coating material. A further possibility is to release the coupling of the modular unit from the coupling section, to open a lock for example.

In a further embodiment the modular unit is provided with an interface intended for wireless data transmission. Accordingly, a corresponding transmitting and/or receiving unit is provided in the coupling area, thus allowing information to be transmitted when charging the modular unit and in turn allowing the planned use of the modular unit to be already scheduled in a work cycle and/or a failed charging of the modular unit to be identified at an early stage.

In a further embodiment the feed section has a multiplicity of feed guides, wherein a separately controllable actuator is provided at an inlet region of every feed guide. This then facilitates the insertion or threading of the coating material in the feed.

According to a further embodiment, an adjustable actuator is provided, which may be moved to any particular feeder. For example, the actuator may be moved along a preferably horizontally aligned rail, which is provided in a vertical direction above the feeders. Should the intention be for another coating material to be moved by the actuator, the latter may be fed/moved in the area of the guide accommodating such coating material.

In the event of an adjustable actuator, this embodiment is not limited to a single actuator. Instead, one actuator each may be provided for a specific area of the multiplicity of feeders.

It is particularly preferred that one adjustable actuator is provided for a number of feeders, which correspond to the number of coating materials fed from one modular unit. In such case, the number of actuators is thus oriented towards the number of coupable modular units.

The actuator or actuators may be fed or moved by means of an adjusting wheel or a drive shaft.

For example, the actuator is provided with a roller-like drive means, or the at least one actuator is designed as a linear actuator. It is also possible to provide an insertion unit, in particular a (multi-axis) robot arm with a gripper unit capable of accommodating one end of a coating material. This then allows rapid and secure implementation of the handling or the insertion of the coating material.

In one embodiment the coupling section includes a frame that surrounds the coupled modular unit in sections. A housing-like coupling section would protect a modular unit from external influences.

It may further be provided that the coupling section has a latching accommodation, for example an opening, which may be engaged with a latching element of a modular unit, thus securely locking the modular unit at the coupling section. The latching accommodation can, for example, be a recess in the floor or in a section of the wall. The latching element is, for example, a pin or a wheel of the modular unit. The latching element may also penetrate the latching accommodation, or vice versa.

In a further embodiment the modular unit is provided with rollers, in order to enable the modular unit to be moved, thus resulting in a perceptive simplification of the workflow, as well as allowing the modular unit to be freely moved.

According to an alternative embodiment, for example, one or more rails, in which the modular unit is guided, are provided on the substrate, thus allowing the modular unit to be securely and specifically moved from a charging location to the coupling section.

The present invention further relates to a use of the aforementioned system for feeding a coating material as well as a method of feeding a coating material using an aforementioned system.

The method comprises the steps of charging a modular unit with at least one coating material unit, moving the modular unit to the coupling section and coupling the modular unit with the feed section. The coating material may subsequently be fed to the feed section.

The invention further relates to a coating device for attaching a coating material to a preferably panel-like workpiece (W), with an aforementioned system.

The coating device may include a conveyor for moving the workpieces. Alternatively, the coating device has a support table or clamping elements, gripping elements or vacuum clamps for example, to hold one or more workpieces.

DETAILED DESCRIPTION OF THE PREFERRED EMBODIMENTS

In the following, a preferred embodiment of the present invention is described in detail based on the accompanying illustrations. All other modifications mentioned in this context may be individually combined with each other to create new embodiments.

Figure 1:
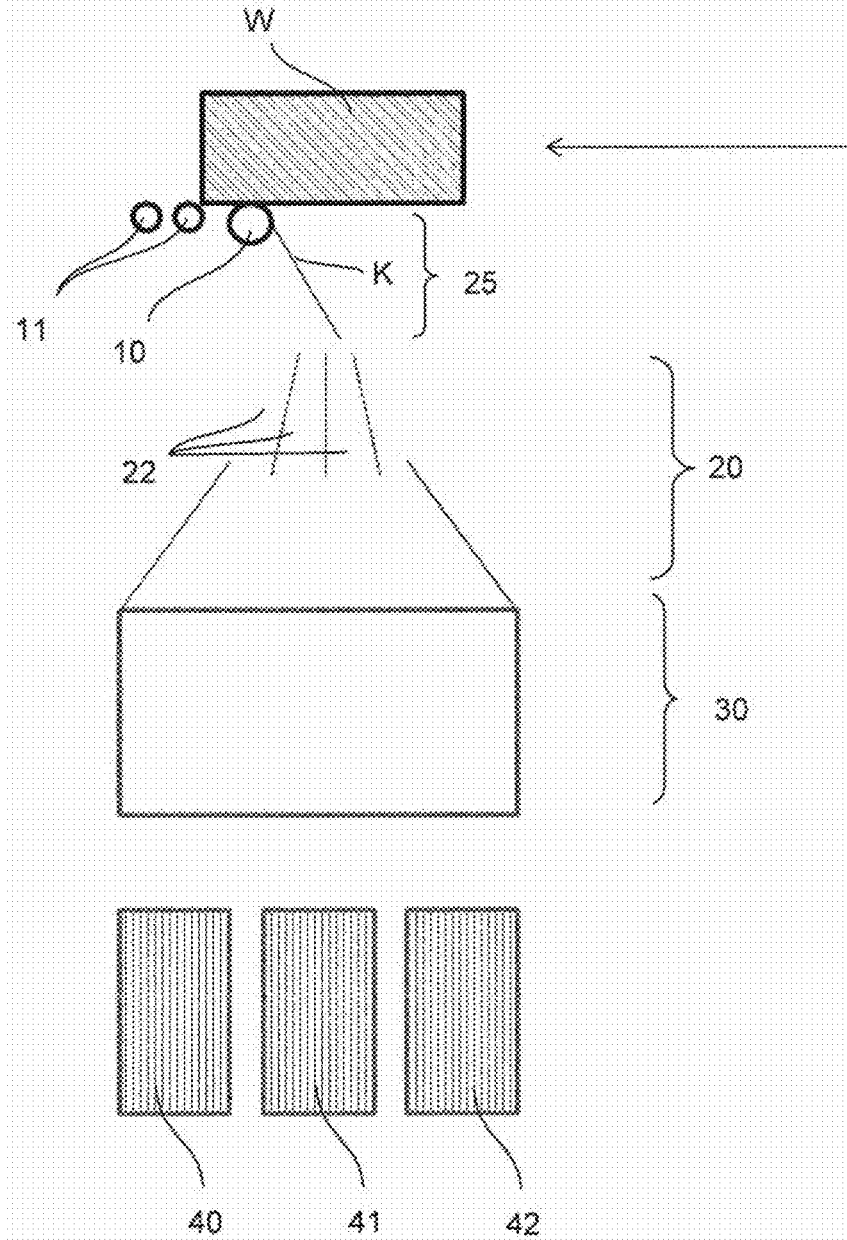
FIG. 1 is a schematic view showing an edge attaching device in an embodiment of the accommodating device according to the invention.
Figure 2:
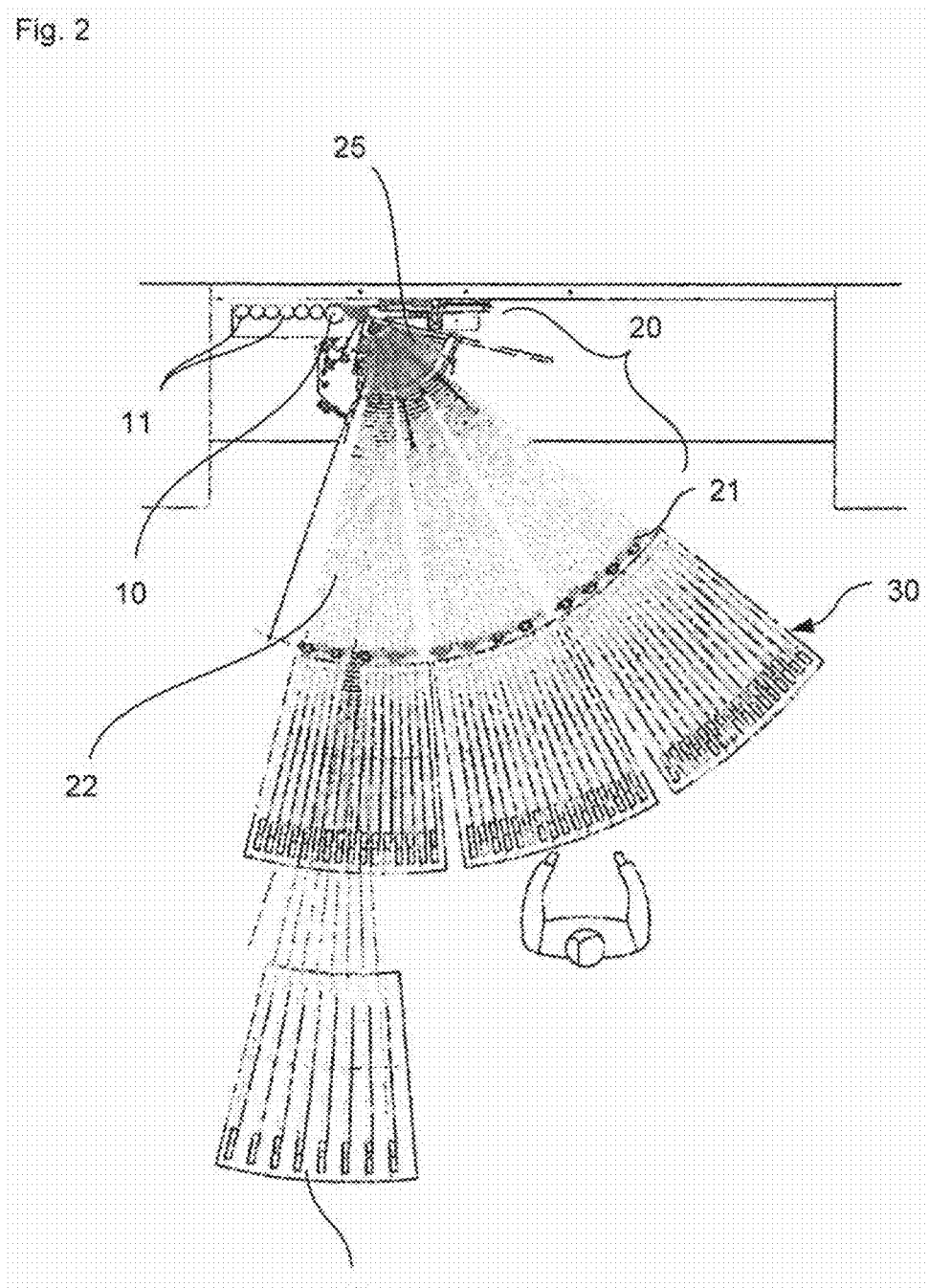
FIG. 2 is a plan view showing an edge attaching device according to a first modification.

The edge attaching device shown in FIG. 1 includes a pressure roller 10 as well as several secondary pressure rollers 11, through which an edge band K (piece goods or coating material) is pressed onto a narrow surface of a panel-like workpiece W. The stated edge band K may be coextruded edges or an edge band, which is provided or will be provided with an adhesive. The edge band K may be pre-coated with the adhesive or said edge band K is provided with adhesive shortly before pressing the edge band K onto a narrow surface of a workpiece W.

A feed section 20 is provided adjacent to the edge attaching device, which is merely shown schematically in FIG. 1.

Edge bands K may be inserted manually, semi-automatically or fully automatically into feed guides 22 of the feed section 20 where they are held ready for attaching to a workpiece W. To this end, the feed section 20 has a multiplicity of actuators 21, which are provided in the inlet region of the feed guides 22 of the feed section 20.

The actuators 21 may include rotating drive means or so-called linear units. Since the actuators are provided in the inlet region of the feed section 20 and thus close to a coupling area 30, any threading of the edge bands K is quick and easy to implement.

Once the edge bands K have been gripped by means of the actuators 21 and guided through the feed guides 22, they reach the respective feed channels of the magazine unit 25. Said magazine unit 25 is designed in such a way that a tailored edge band K may be buffered in each of the feed channels and thus held for attaching to a workpiece W.

The multiplicity of feed channels converges towards a magazine unit 25, which is located close to the pressure roller 25. In this area, an edge band K from the individual feed channel reaches the section in which an adhesive is applied or an adhesive already located on the edge band K is activated by means of an energy source, and subsequently pressed onto a narrow side of a workpiece W by means of the pressure roller 11.

Said energy source may be selected from a laser, a hot air source or gasification source, an infrared source, an ultrasound source, a magnetic field source, a microwave source or a plasma source.

The coupling area 30 is further provided adjacent to the inlet region of the feed section 20. The coupling area 30 is configured in such a way as to accommodate individual modular units 40, 41, 42, thus enabling the latter to be coupled with the feed section 20. Each modular unit is intended to accommodate several edge bands K, wherein said edge bands K are preferably accommodated in individual cassettes.

Figure 4:
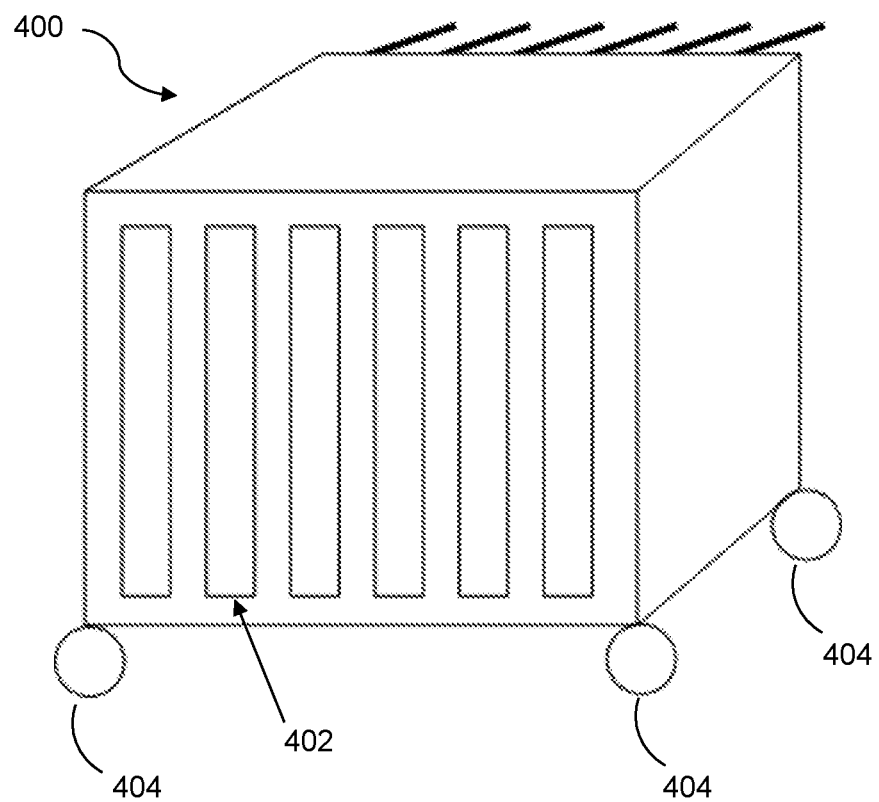
FIG. 4 illustrates an example modular unit having a grid for accumulating cassettes of a certain width.

The modular units 40, 41, 42 may have a fixed grid for specific cassettes of edge bands, and therefore only cassettes of a certain width may be loaded in a certain modular unit. A specific modular unit is thus characteristic for a specific type of edge band. For example, FIG. 4 illustrates a modular unit 400 (e.g., corresponding to one or more of elements 40-42) having a grid 402 for accumulating cassettes of a certain width. The modular unit 400 further includes rollers 404.

Figure 5:
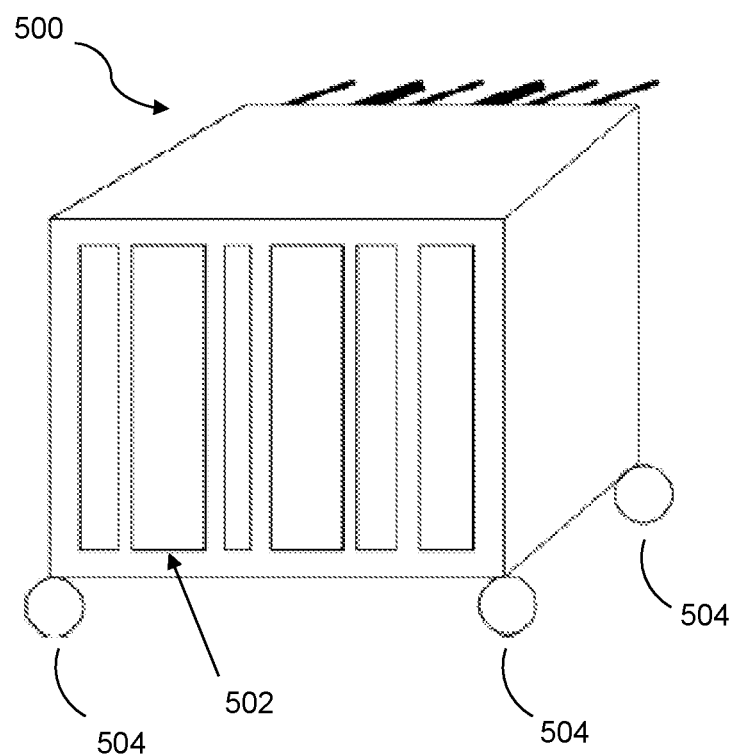
FIG. 5 illustrates an example modular unit having a variable insert for accumulating cassettes of a different width.

An alternative possibility is for the modular units 40, 41, 42 to be designed without grid, thus enabling different cassettes and thus edge bands of different widths to be accommodated. This then allows a further increase in flexibility when using a specific modular unit. It is also possible to use the modular units for different tasks, wherein, for example, cassettes with edge bands of a first width are used in a first case and cassettes with edge bands of a second width in another case. For example, FIG. 5 illustrates a modular unit 500 (e.g., corresponding to one or more of elements 40-42) having a variable insert 502 for accumulating cassettes of a different width. The modular unit 500 further includes rollers 504.

The modular units 40, 41, 42 allow the most varied of edge bands K to be charged in the respective modular units 40, 41, 42 and the respective modular units 40, 41, 42 to be subsequently inserted in the storage unit 30, thus enabling edge bands K to be exchanged in groups and preparing the edge attaching device for a new work shift. Consequently, the machine operator does not need to insert individual cassettes in a storage unit adjacent to the feed section.

Figure 6:
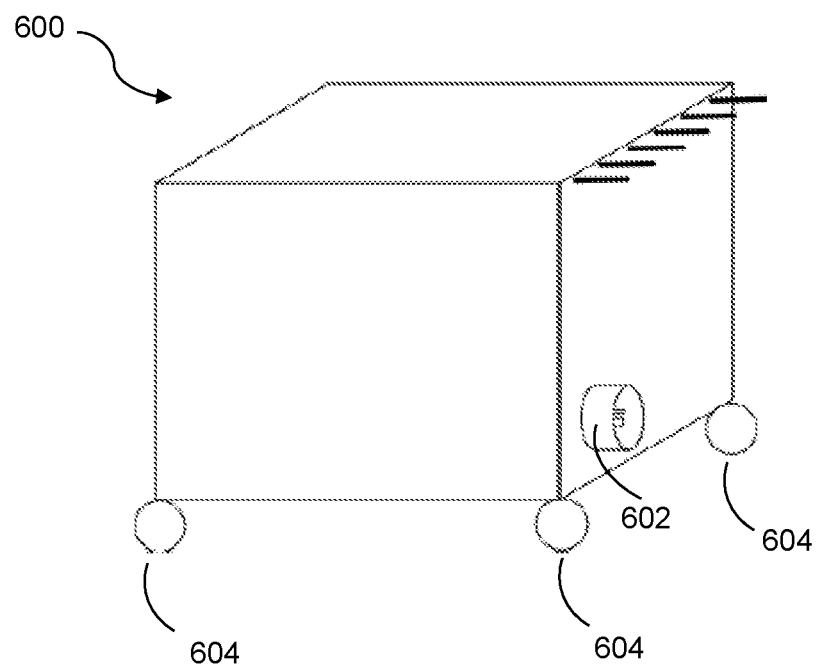
FIG. 6 illustrates an example modular unit having a coupling section for coupling to a feeding section.

Such an exchange of individual cassettes in the area of the coupling section would actually be possible. However, the modular units 40-42 are designed as movable carriages, thus allowing the carriage to be charged at a location other than the coupling section and subsequently moved to the coupling section. The coupling ensures that the edge bands are correctly positioned for insertion in the feed section. For example, FIG. 6 illustrates a modular unit 600 (e.g., corresponding to one or more of elements 40-42) having a coupling section 602 for coupling to a feeding section. The coupling section 602 may correspond to an electrical interface for electrically coupling the modular unit 602 with the feed section (e.g., element 20), and/or may correspond to a connection area for hydraulically, pneumatically and/or mechanically coupling the modular unit 602 with the feed section (e.g., element 20).

Figure 3:
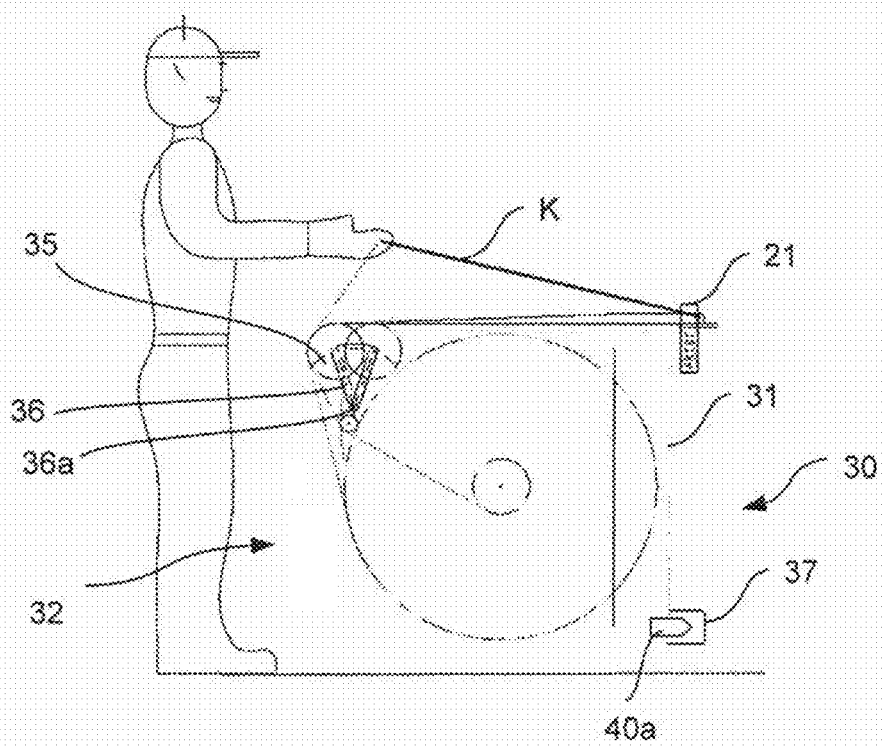
FIG. 3 is a schematic side view depicting the insertion of an edge band in an actuator to move the edge band.

FIG. 3 shows a schematic view of the insertion of an edge band K in an actuator 21 of the feed section 20. Such an insertion or threading of the edge band K is required when one of the modular units 40, 41, 42 is exchanged for several edge bands. An alignment and, where appropriate, fixation of a modular unit ensues in that a latching element 40a of such modular unit is introduced into a latching accommodation 37 of the coupling section 30.

The edge band K, which is accommodated in the individual modular unit in a cassette, protrudes from the storage unit 30 and can be picked up by a worker during manual threading and guided around a deflection roller 35, which is provided in an upper corner area of the storage unit 30. The deflection roller 35 may be pivoted around a hinge 36 vis-à-vis a horizontally aligned axis 36a.

Proceeding from the deflection roller 35, the edge band K is moved along the upper side of the storage unit 30 and inserted in an actuator 21. Said actuator 21 grips the edge band K and moves the latter into the feed section 20 or into an individual feed guide 22 as well as subsequently into a corresponding feed channel.

Since the actuator 21 is arranged at an end section of the storage unit 30 opposite to the deflection roller 35 and the actuator 21 assumes the conveyance of the edge band K, threading and commissioning are able to be rapidly implemented.

Figure 7:
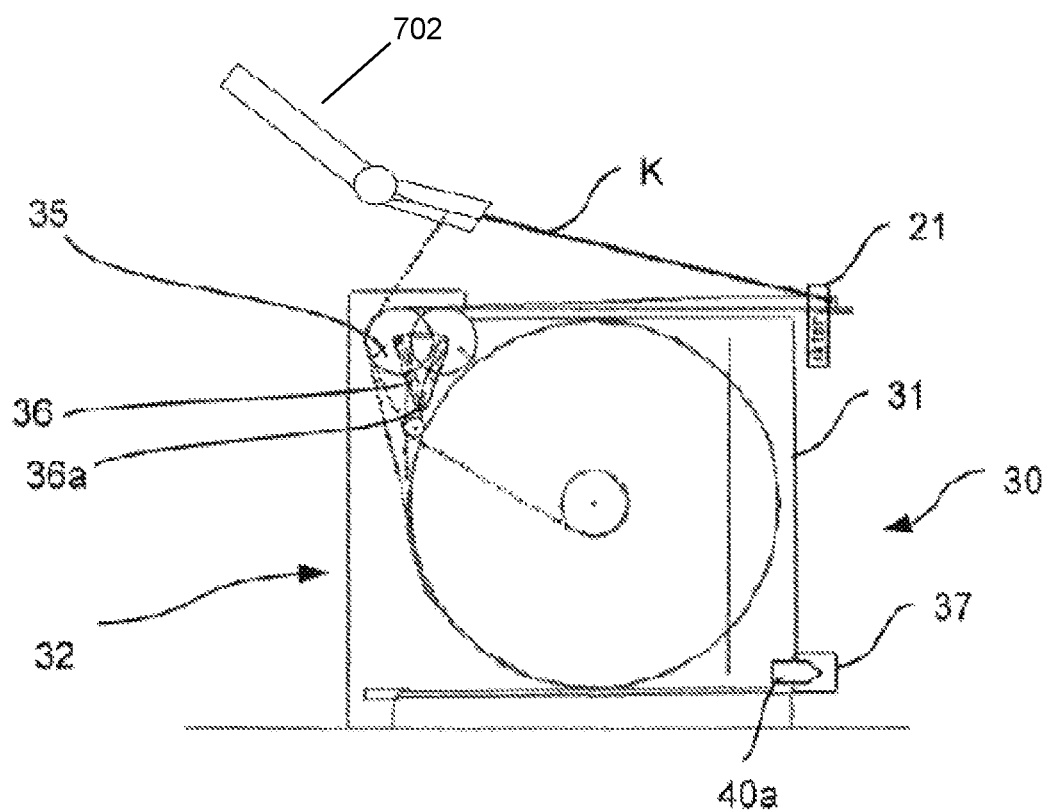
FIG. 7 illustrates an example of a robot arm with a gripping unit.

In a further modification of the present invention the threading of the edge band K may also be implemented by a robot arm as an example of an insertion unit, which is attached at feed section 20 for example. The robot arm grips an end section of an edge band K, which is near at hand after the loading of the respective modular units 40, 41, 42, and inserts this edge band in an actuator 21. For example, FIG. 7 illustrates a robot arm 702 with a gripping unit.

In addition, the feed section 20 may be shorter according to a further modification and only include the magazine section 25. According to this modification, the actuators 21 are provided at an inlet section of the magazine unit 25, with the feed guides 22 being omitted, thus reducing the depth of the feed section 20.

Even though three modular units are shown in the preferred embodiment, the present invention is not limited thereto.

The invention claimed is:

1. A system for feeding a coating material from at least one movable modular unit, the at least one movable modular unit being provided for the accommodation and provision of roll-shaped or coil-shaped coating material units comprising edge bands configured to attach to a narrow side of panel-shaped workpieces, to a coating device, comprising:
a feed section for accommodating and transporting the coating material, wherein the feed section has a multiplicity of feed guides, and wherein (a) a separately controllable actuator, or (b) an adjustable actuator, is provided at an inlet region of each feed guide;
a magazine unit for guiding the coating material provided by the feed section;
the at least one movable modular unit; and
a coupling section for coupling the at least one movable modular unit at the feed section, the at least one movable modular unit accommodating coating material units,
wherein the coupling section has a latching accommodation which may be engaged with a latching element of the at least one movable modular unit, and
wherein the coupling section has an electrical interface for electrically coupling the at least one movable modular unit with the feed section.

2. The system according to claim 1, wherein the at least one movable modular unit is configured to accommodate cassettes, and wherein each cassette accommodates the coating material unit.

3. The system according to claim 2, wherein the at least one movable modular unit has a grid for accommodating cassettes of a certain width.

4. The system according to claim 2, wherein the at least one movable modular unit has a variable insert for accommodating cassettes of different widths.

5. The system according to claim 1, wherein the at least one movable modular unit has a rotatable axis or an enveloping circle for accommodating the coating material units.

6. The system according to claim 1, wherein the feed section in an area of the coupling section has at least one deflection roller for guiding the coating material of the coating material unit from an operating side of the coupling section to the feed section.

7. The system according to claim 1, wherein the coupling section is configured to couple movable modular units of differing dimensions.

8. The system according to claim 1, wherein the at least one movable modular unit accommodates the roll-shaped or coil-shaped coating material units in such a way that the axis of rotation of the coating material units is horizontally aligned.

9. The system according to claim 1, wherein the coupling section has a connection area for hydraulically or pneumatically coupling the at least one movable modular unit with the feed section.

10. The system according to claim 1, wherein at least one actuator includes a roller-shaped drive means, or the at least one actuator is designed as a linear actuator.

11. The system according to one of claims 1, wherein an insertion unit comprising a robot arm with a gripping unit, is attached at the feed section for accommodating an end of the coating material provided in the at least one movable modular unit.

12. The system according to claim 1, wherein the coupling section includes a frame, which surrounds the coupled at least, one movable modular unit in sections.

13. The system according to claim 1, wherein the at least one movable modular unit is provided with rollers to allow the at least one movable modular unit to be moved.

14. A method of feeding a coating material using a system according to claim 1, comprising the steps:
charging the at least one movable modular unit with at least one coating material unit;
moving the at least one movable modular unit to the coupling section; and
coupling the at least one movable modular unit with the feed section.

15. The system according to claim 1, wherein the latching accommodation is an opening.

* * * * *